Nov. 3, 1942.                    A. G. HANN                    2,301,041
                            VALVE ADJUSTING MEANS
                            Filed Sept. 29, 1939                2 Sheets-Sheet 1

Nov. 3, 1942.                    A. G. HANN                    2,301,041
                            VALVE ADJUSTING MEANS
                            Filed Sept. 29, 1939                 2 Sheets-Sheet 2.

INVENTOR.
Albert G. Hann
BY
Andrew K. Foulds
his ATTORNEY

Patented Nov. 3, 1942

2,301,041

UNITED STATES PATENT OFFICE 2,301,041

VALVE ADJUSTING MEANS

Albert G. Hann, Detroit, Mich., assignor to Detroit Lubricator Company, Detroit, Mich., a corporation of Michigan Application September 29, 1939, Serial No. 297,143

19 Claims. (Cl. 137—21)

My invention relates generally to control devices and more particularly to means for adjusting the position of an operating member, such for example as a valve for regulating the rate of flow of fluid.

One of the objects of my invention is to provide a new and improved adjusting means for adjusting the position of the operating member or valve, and which has a wide and variable adjusting range.

Another object of my invention is to provide new and improved adjusting means for adjusting the flow of fuel to or the flame of a burner and which means has an adjusting range for controlling the flame between a relatively low flame and a relatively high flame, the range being adjustable to meet the requirements of different burner installations.

Another object of my invention is to provide new and improved adjusting means for varying the rate of flow of a fluid and one by means of which a gradual change in the rate of flow may be obtained over a relatively wide range of adjustment.

Another object of my invention is to provide new and improved adjusting means for changing the rate of flow of a fluid and which has a plurality of different phases of adjustments obtainable through the operation of a single manually operable adjustment member.

Another object of my invention is to provide a new and improved cam and cam follower structure for adjusting the position of an operating member or of a valve to control flow of fluid.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated my invention, in which drawings—

Figures 1, 2, 3, 4, 5, 6, 7:
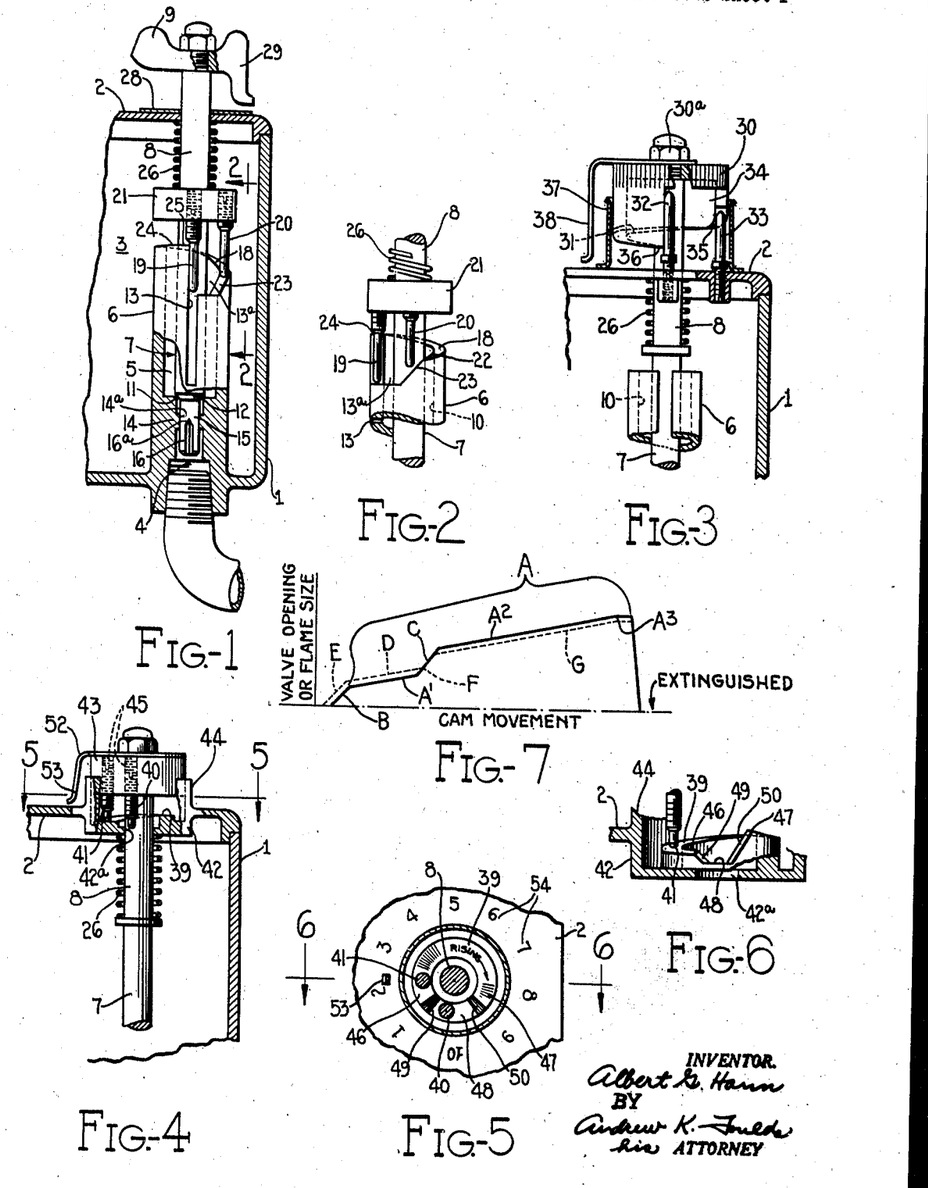
Figure 1 is a fragmentary view shown partly in elevation and partly in section of a control device having my novel adjusting means.
Fig. 2 is a fragmentary view in elevation of the adjusting means and taken in the direction of the arrows 2—2 of Fig. 1.
Fig. 3 is a fragmentary view shown partly in elevation and partly in section of a modified form of the adjusting means.
Fig. 4 is a fragmentary view shown partly in elevation and partly in section of still another form of the adjusting means.
Fig. 5 is a view in section on the line 5—5 of Fig. 4.
Fig. 6 is a view in section on the line 6—6 of Fig. 5, but showing certain cam means in elevation.
Fig. 7 is a chart for illustrating how a burner flame may be regulated by the adjusting means of Figs. 1, 3 and 4.
Figure 13:
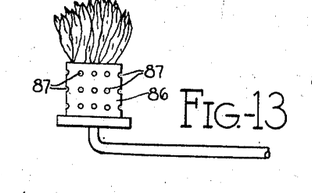
Fig. 13 is a diagrammatic view of a well known type of oil burner at high fire.
Figure 14:
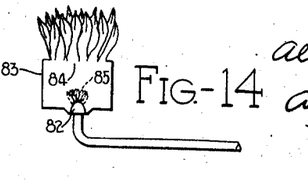
Fig. 14 is a diagrammatic view of another well known type of oil burner showing in full lines "high" fire and in dotted lines a low or pilot fire.

Referring first to Figs. 1 and 2 of the drawings, the numeral 1 designates in general the container or casing of a gravity feed control device of the type adapted among other uses for controlling flow of oil or other liquid fuel by gravity to a burner, such for example as are shown in Figs. 13 and 14. Preferably a removable closure member or cover 2 forms the top wall of the casing, and may be attached to the casing side walls by screws or by other suitable attaching means (not shown). The casing 1 has a liquid receiving reservoir or chamber 3 for the fuel or oil, with an oil inlet (not shown) and with an oil outlet 4. In the chamber 3 a substantially constant liquid level is maintained, as for example by mechanism which may comprise a float actuated valve (not shown) for controlling the inlet to the chamber, said mechanism being well known in the art to which this invention appertains. The outlet 4 is preferably located in the bottom wall of casing 1 and opens upwardly into and receives liquid from the chamber 3 which feeds to chamber 5 within a tubular wall member 6. The member 6 may be integral with and extend upwardly from the casing bottom wall, as shown, and has its upper end open and spaced from and terminating below the cover 2.

Disposed in the chamber 5 and extending concentrically and longitudinally upward through member 6 there is a manually operable valve member 7 for controlling or regulating the rate of flow of oil from outlet 4, and this valve member is both rotatably and rectilinearly movable. The valve member 7 has a vertically extending stem 8 that projects above the top end of member 6 and also preferably projects externally of the casing through an aperture in the cover 2. On and secured to the stem externally of the casing 1 there is preferably a hand grip or handle 9 by means of which the valve member 7 may be rotated conveniently, or if desired may be pulled longitudinally upward. Preferably the upper portion of the tubular member 6 which forms the chamber 5 is of enlarged internal diameter, as at 10, to provide a liquid flow chamber and an internal, upwardly facing, annular valve seat 11. Adjacent its lower end the valve member 7 may have a downwardly facing, conically formed portion 12 for engaging the seat 11 to stop flow of liquid from outlet 4. The tubular wall member 6 is provided with a vertically extending slot 13 through its side wall for the passage of oil from chamber 3 into the chamber 5, the slot terminating at its lower end above valve seat 11 and at its upper end running out at or opening through the upper end face of the wall of tubular member 6. Below and spaced downward from the seat 11 the tubular member 6 has an internal transverse wall 14 provided with a valve port or aperture 14$^a$ therethrough of less diameter than the diameter of seat 11. The lower end portion 15 of the valve member 7, which is of reduced diameter below conical portion 12, slidably fits and is received and guided in and through the aperture in transverse wall 14.

The lower end portion 15 of valve member 7 has a vertically extending, metering or main burner flame supply slot 16 that may run out at the lower end of the valve member, as shown. The slot 16 decreases in depth toward its upper end where it terminates in a V-shaped portion 16$^a$ for pilot flame supply, the opposed side walls of portion 16$^a$ converging upwardly to an apex which is preferably located so that it will be below the upper surface of transverse wall 14, and the slot will be closed by the wall of port 14$^a$ when the valve portion 12 is seated. By moving the valve member 7 upward slightly, it will be moved off of its seat 11 and an upper portion of the area of the V-shaped slot portion 16$^a$ will be positioned above the upper face of transverse wall 14 providing a relatively small capacity opening to obtain a minimum rate of flow of liquid, or oil, from outlet 4. As the valve member 7 is moved further upward, more of the area of the V-shaped slot portion 16$^a$, and finally an increasing cross-sectional area of slot 16, will be positioned above the upper surface of wall 14 and be in communication with valve chamber 5, resulting, with a given liquid head or level, in a corresponding increase in the rate of flow of fluid from outlet 4.

Formed on the upper end of the tubular member 6 there is a cam 18 of generally helical shape, and carried by the valve member 7 there is a pair of cam follower members 19 and 20 for engaging the cam to move the valve to and hold the valve in a desired position to obtain a desired rate of flow of fluid from the outlet 4. The valve stem 8 has an enlarged portion or horizontal flange 21 above the cam 18 to receive and support the cam follower members 19 and 20 which are preferably in the form of pins or screws and are adjustably screw-threaded into the flange 21. The cam follower members 19 and 20 extend downward from the underface of flange 21, longitudinally of the valve stem 8, and are preferably spaced approximately 90° apart and at equal radial distances from the longitudinal axis of the valve member 7. At their lower ends the cam members 19 and 20 are preferably rounded, as shown, to reduce friction between the members and the working surface of cam 18. The upwardly facing cam surface 18 is interrupted by the vertically extending slot 13, and the width of the slot is preferably enlarged, as at 13$^a$, so that it will receive both of the arcuately spaced adjustment members 19 and 20 at the same time. Also, the depth of the enlarged slot portion 13$^a$ is made such that the valve member 7 can descend and positively engage its seat 11 when it is rotated to the position where both of the adjustment members 19 and 20 descend into the slot 13$^a$. At one side of the slot 13$^a$ is the low point of the cam, designated by the numeral 22, and leading up to the low cam point 22 there is preferably an inclined cam portion 23 having an abrupt rise up which the adjustment members 19 and 20 are adapted to ride onto the cam surface 18. The cam surface 18 preferably extends unbroken from the low point 22 with gradual inclination around the upper end of the tubular member 6 to the high point of the cam surface, designated by the numeral 24, terminating adjacent the other side or wall of the slot 13$^a$. From the high point 24 of the cam to the slot 13$^a$ the upper end of the tubular member 6 preferably has a horizontal portion 25 on which the adjustment member 19 is adapted to ride without changing the position of the valve member 7.

The follower member 19 is adjusted so that its lower end is below the lower end of the follower member 20, and these members 19 and 20 may be termed respectively the maximum flow adjustment member and the minimum flow adjustment member. When the maximum flow adjustment member 19 is on the high point 24 of cam 18 and is rotated in a valve opening direction, no change will be made in the adjustment of the valve as the member 19 traverses the horizontal portion 25, but when the member 19 reaches the end of the horizontal portion 25 and passes beyond the wall of slot 13, it will drop down in the slot 13$^a$ permitting the valve to descend to closed position and stop flow of fluid. The horizontal portion 25 permits of slight rotation of the valve member 7 in maximum open position without altering the rate of flow of fluid. The side wall of the slot 13$^a$ adjacent the high cam portion 24 serves as an abutment or stop against which the maximum adjustment member 19 abuts when the valve is attempted to be rotated reversely from closed position and in a clockwise direction, as seen from the top of the device. However, if it is desired to move the valve from closed position directly to maximum open position, this may be accomplished by raising the valve straight upward against its downward closing force and until the maximum adjustment member 19 clears the high portion 25, after which the valve stem can be rotated reversely and the follower member 19 can be positioned on the portion 25. A coil spring 26 under compression is provided for urging the valve member 7 downward to its seat, and surrounds the valve stem 8 with one end of the spring abutting the upper face of the valve stem flange 21 and the other end abutting the underside of the casing cover 2.

To open the valve gradually, the valve member 7 is rotated by means of the handle 9 in a counterclockwise direction, as seen from a top plan view thereof (not shown), and when the lower end of the minimum adjustment cam follower 20 engages the inclined surface 23, further rotation will cause member 20 to ride up the cam incline 23 causing the valve to be moved rectilinearly upward away from its seat 11. When the minimum adjustment cam follower 20 is positioned on or has ridden up onto the lowermost point 22 of the cam surface 18, the valve member 7 will have been moved upward a distance in accordance with the adjustment of follower member 20 in flange 21, and preferably such that a relatively small portion of the area of the V-shaped metering aperture 16ᵃ will be in open communication with the liquid fuel in the chambers 3 and 5. In this position of the valve member 7, which is the initial position in which the member 20 will frictionally hold against the spring 26 and maintain the valve member in raised position, fuel will flow at a minimum rate from outlet 4 to a burner and maintain a minimum low burner flame. Further rotation of the valve member 7 in a valve opening direction will cause the minimum flow adjustment or follower member 20 to climb the gradually inclined cam surface 18, thereby moving the valve member upward and correspondingly increasing the rate of flow from outlet 4. The term "minimum low flame" as above used does not necessarily mean the lowest possible or practicable burner flame obtainable by my adjustment means for, as will later be seen, the minimum low burner flame that may be had when adjustment member 20 is seated and held by friction on the low point of cam 18 may be varied as desired, within the limitation of the burner, by adjustment of member 20.

After the minimum or pilot or low flame flow adjustment member 20 has been moved through a predetermined arc in a valve opening direction, which arc in the present instance is about 90°, the maximum or high or main flame flow adjustment member or cam follower 19 will engage the incline 23 that leads up onto the cam surface 18. Further rotation of the valve member 7 in its counterclockwise or valve opening direction will cause the maximum flow adjustment member 19 to climb the incline 23 which will cause the valve to be moved upward at an increased rate and relatively abruptly. Also, the minimum flow adjustment or follower member 20 will be moved out of engagement with the cam surface 18 when the maximum flow adjustment or follower member 19 starts riding up the incline 23, due to the maximum adjustment member depending to a lower point than the minimum adjustment member. The minimum adjustment member 20, where it last engages the cam 18, determines the highest minimum or pilot burner flame for a given setting of member 20, whereas the lowest main or maximum burner flame for a given setting of member 19 is determined by the maximum adjustment member 19 when it is engaging and in initial frictional holding position on the low point 22 of the cam 18. By continuing the counterclockwise rotation of the valve member 7 so that the maximum adjustment member 19 rests on the high point 24, or horizontal portion 25 of the cam 18, the highest main or maximum burner flame is obtained for a given setting of the maximum adjustment member 19. Thus it will be seen that for a particular setting of the adjustment or cam follower member 20, a predetermined minimum low rate of flow of fuel will be had to a burner to obtain a corresponding minimum low burner flame when the adjustment member 20 is resting on the low point 22 of cam 18. Also, a predetermined high minimum rate of flow of fuel will be had to a burner when the adjustment member 20 is resting on that point of the cam surface 18 just in advance of and substantially at the point where it leaves the cam surface, due to the member 19 beginning to climb the incline 23. It will also be seen that the maximum low burner flame obtainable and maintainable by the maximum adjustment member 19 for a particular setting is when the member 19 is resting on the low point 22 of the cam 18, and that the maximum high burner flame obtainable and maintainable by the member 19 is when the member 19 is resting on the high point 24, or high portion 25 of the cam. It will further be seen that my valve adjusting means provides a wide range of adjustment of the valve, for this range corresponds to the total lift of the valve member by member 20, that is, the vertical distance from the lower point 22 of the cam to the point at which the minimum adjustment member 20 leaves the cam, plus the total lift of the valve member by member 19 as it rides up the incline 23 and travels the vertical distance from the low point of the cam to the high point of the cam. By my valve adjusting means any desired high and low flame limits may be obtained to accommodate different installations since the cam member 19 is adjustable to provide, when it reaches the high point 24, the maximum possible flow through port 14ᵃ. For example, the minimum adjustment member 20 could be set so that when it rests on the low point 22 of the cam 18 the smallest practicable flame could be obtained and the maximum adjustment member 19 could be set so that when it rests on the high point of the cam the highest practicable flame could be obtained. Also, the minimum and maximum adjustment members could be adjusted to obtain any number of various ranges, or different high and low flame limits between the above-mentioned extreme limits. When the most suitable high and low burner flames for a particular installation have been ascertained, the minimum and maximum adjustment members 19 and 20 may be set to obtain these limits. By raising or lowering both of the adjustment members 19 and 20 by an equal amount, the range may be raised or lowered while the differential between low and high fire may remain constant. Or by adjusting one or the other of the members 19 and 20, both the range and differential between a low and high burner flame may be changed. It will thus be seen that a multitude of different high and low burner flame adjustments can be made to accommodate different installations. The cover 2 may have a dial plate 28, or indicia may be provided on the upper face thereof, designating different settings of the valve between closed and maximum open position, and the handle 9 may be provided with a depending portion 29 in the form of a pointer for cooperation with the indicia to conveniently set the valve as desired.

Referring now to the form of my valve adjusting means shown in Fig. 3, the valve stem 8, as in Fig. 1, projects externally of the casing through an aperture in the removable cover 2, and secured to the upper end of the valve stem there is a manually operable means in the form of a knob or cylinder 30 by means of which the valve member 7 may be rotated instead of by a handle, as in Fig. 1. The knob 30 has its end wall apertured to receive the stem and may be secured to the stem 8 by a nut 30ª. The knob 30 may be hollow, as shown, having its lower end open, with the lower end edge or undersurface of the side wall of the knob formed or cut to provide a helical cam surface 31 of gradual inclination. Carried by the removable cover 2 there is a pair of spaced, upwardly directed cam engaging members 32, 33 for cooperation with the cam surface 31 to adjust the position of valve member 7. The cam engaging members 32, 33 are adjustably screw-threaded into the cover 2 and are preferably formed having hexagon shaped portions above the cover for engagement by a tool by means of which to rotate and vertically adjust the members 32, 33 as desired. The members 32, 33 are adjusted such that the upper end of the member 32 projects a predetermined distance above the upper end of the member 33. The higher projecting member 32 is thus the maximum flow adjustment and the member 33 is the minimum flow adjustment. The side wall of knob 30 has a cut-out or space 34 for receiving both of the adjustment members, as shown, to permit the valve to seat. The cam 31, like cam 18 of Fig. 1, preferably has a steeply inclined portion 35 leading up to the low point of the cam, and has a flattened portion 36 constituting the high portion of the cam. When the knob 30 is rotated in a valve opening direction until the high or flattened portion of the cam is moved out of engagement with member 32, the knob 30 will drop down by gravity and the force of spring 26, to the position shown, in which position the valve will be closed. As in the form of Fig. 1, when the proper low flame and high flames for a particular installation have been ascertained, the adjustment members 32 and 33 may be set accordingly to obtain the desired minimum and maximum flame limits. An open ended tubular member 37 seats on the upper face of the cover 2 and surrounds a lower end portion of the knob 30 to shield the adjustment members 32, 33 from view. The tubular member 37 is loosely disposed and supported on the cover 2 so that it can be readily raised to give access to the adjustment members when it is desired to adjust the same. Carried by the knob 30 there is a pointer 38 for cooperation with indicia on the face of cover 2 for conveniently and accurately setting the valve to obtain a desired burner flame.

Referring now to the form of my adjusting means shown in Figs. 4, 5 and 6, a helical cam surface 39 is formed on the casing cover 2, and movable with the valve member 7 there is a pair of adjustment cam follower members 40, 41 for engaging the cam surface to adjust or move the valve to regulate flow. The cover 2 has on its underside a downwardly directed, extended, hollow cylindrical portion or boss 42 on the upper or inner face of which the helical cam surface 39 is formed. The boss 42 is provided with an aperture 42ª therethrough, centrally of the helical cam 39, through which the valve stem 8 projects upward and externally of the casing 1. A manually operable means, preferably in the form of a cylindrical knob 43, is secured to the upper external end of stem 8. The adjustment members 40, 41 are carried by the knob and depend therefrom in position to engage the cam surface 39. A lower end portion of knob 43 is preferably closely surrounded by an upstanding, cup-shaped wall portion 44 as an extension of the side wall of boss 42. The cylindrical portion 44 serves to shield the adjustment members 40, 41 from view, and is preferably an integral part of the cover 2.

The knob 43 is preferably provided with spaced, vertically extending, threaded apertures 45 therethrough for receiving the adjustment members 40 and 41 which, as in the other forms, are preferably threaded pins or screws. The adjustment members or pins 40, 41, as well as the adjustment pins 19 and 20 of Fig. 1, may have slots in their upper ends for receiving a tool, such as a screw driver, for adjusting the pins. The adjustment member 40 is adjusted so that its lower end projects below the lower end of adjustment member 41 and thus the member 40 is the maximum flame adjustment and the member 41 is the minimum flame adjustment. After the adjustment members 40, 41 have been set to obtain the desired or proper maximum and minimum flame adjustments for a given installation, the threaded apertures 45 above the slotted ends of the adjustment members 40, 41 are preferably closed by a sealing material, which may be any suitable wax, to discourage tampering with the adjustment members. The sealing means may also serve to prevent rotation of the screws 40, 41 from their adjusted or desired positions, which might otherwise occur due to vibrations or other causes. The low and high points of the cam 39 are designated by the numerals 46 and 47 respectively, Fig. 5, and between these adjacent points the upper surface of the bottom wall of boss 42 is provided with a cutout space or opening 48 to receive simultaneously both of the members 40, 41 to permit seating of the valve. The cam 39 may be provided, within the length of opening 48, with an inclined portion 49 leading up onto the low point of the cam, and may be provided with a steeply inclined portion 50 leading down from the high point of the cam. Preferably the knob 43 is secured to the valve stem 8 by a nut 51, and secured to the knob by the nut there is a pointer member 52. The pointer 52 is clamped between the nut 51 and the top face of the knob 43 and is preferably of plate-like form overlying and closing the threaded apertures of the adjustment members 40, 41. The pointer member 52 has a downwardly directed, extended portion or finger 53 that terminates adjacent the cover 2 which is provided with a circularly arranged series of members or suitable indicia, as shown in Fig. 5, for cooperation with the pointer 53 (Figs. 4 and 5) so that the valve may be set to obtain a desired rate of flow to a burner.

The indicating means comprising the pointer 53 and the indicia 54 provides means for indicating or designating that the valve has opening movement and also that the valve member is in its desired low flow position and also in its desired high flow position. It will be noted that the numeral "1" of the indicia 54 is radially aligned with the start of the low point 46, and that the numeral "9" of the indicia 54 is radially aligned with the end of the high point 47 of the cam means 39. It will also be noted that the pointer 53 is fixed against rotation relative to the follower members 40, 41. Therefore, it will be apparent that irrespective of the adjustment of the follower members 40, 41 to establish the desired high and low fuel flows respectively, that when the follower member 41 is on the low point of the cam and the valve member is in its desired low flow regulating position, the finger or pointer 53 will be opposite the numeral "1." It will also be apparent that irrespective of adjustment of the follower member 40, the pointer 53 when it is opposite the numeral "10" will always indicate that the valve member is adjusted for the desired maximum flow of fuel to the burner. Also, it will be apparent that any positioning of the pointer 53 between the numeral "1" and the numeral "10" will indicate that the valve member has been moved to a further open position from its desired low flow regulating position.

Referring now to the chart of Fig. 7, this chart shows a few of the many different low and high flame adjustments that may be obtained, and which adjustments are common to all three of the previously described adjustment means. In the chart, the solid line designated A may be taken for purposes of illustration as representing an established, predetermined range of adjustment between desired minimum and maximum burner flames for a particular installation. Also, in the present chart, the solid line A may be taken as representing a range of adjustment between the lowest possible or practicable flame desired or obtainable, and the highest possible or practicable flame desired or obtainable. The abrupt inclined portion of line A, designated B, represents the increase in the burner flame as the minimum adjustment member climbs the abrupt incline to the low point 22 of the cam. The inclined line portion C represents the abrupt increase in the burner flame when the maximum adjustment member rides up the incline leading to the low point of the cam. The portion A' of line A between the abrupt upper end of the rise B and the beginning of the rise C represents the range of adjustment of the burner flame by the minimum adjustment member between minimum low and minimum high flame, while the portion of the line A² between the top of the rise C and the highest point A³ of the line represents the range of adjustment by the maximum adjustment member between maximum low flame and maximum high flame. If for a particular installation the setting for maximum high burner flame is found satisfactory, but the minimum burner flame should be increased or be higher than the minimum maintainable low or lowest possible burner flame, then the minimum adjustment member will be adjusted so that it will engage with the incline leading up to the cam surface at a lower point than before. This will cause the valve to have been raised to a correspondingly higher point when the minimum adjustment member is raised onto the low point of the cam, with the result that the rate of flow of fuel to the burner, throughout minimum burner flame adjustment, will be increased. In the chart, the spacing of the dotted line designated D from the line A' represents the adjustment range of the minimum adjustment member when the member is adjusted as above mentioned for an increased minimum low flame. This adjustment of the minimum adjustment member establishes a new minimum low burner flame as indicated at E and a new minimum high burner flame as indicated at F. From the above description it will be seen that, in the same manner, the range between maximum low burner flame and maximum high burner flame may be adjusted as desired. The dotted line G represents a lower maximum range of adjustment of a burner flame obtainable by adjusting the maximum adjustment member so that it will engage the incline leading up to the cam at a higher point than before. The vertical distance from the horizontal dot-and-dash line designated "Extinguished" to any point on the line A indicates the extent of valve opening movement for that setting of the minimum and maximum adjustment member, the vertical distance to lines D and G indicating the opening movement for a different setting.

Referring now to the form of my invention shown in Figs. 8, 9, 10 and 11, which is the preferred form, the supporting member or casing 1 has a cover 55 that has on its underside a downwardly directed, offset wall portion 56 having a substantially cylindrical base on the upper face of which are formed two raised, helical, concentric cam surfaces 57, 58. The smaller diameter and inner cam surface 57 has a relatively slight or small rate of inclination or pitch, while the outer or larger diameter cam surface 58 has a relatively greater rate of rise or inclination. The offset wall portion 56 is provided with an aperture 59 therethrough concentric with the cam surfaces 57, 58 and through which aperture the valve stem 8 projects upwardly and externally of the casing 1. Secured to the upper end of the valve stem 8 there is a manually operable means preferably in the form of a substantially cylindrical supporting member or knob 60 for rotating the valve member 7. The knob 60 terminates at its upper end in a marginal, laterally extending finger grip flange 60ª, and has a centrally disposed aperture therethrough for receiving an upper reduced end portion 61 of the stem 8, the reduced portion providing an upward facing shoulder on which the knob seats and being externally threaded for receiving a nut 62 for rigidly securing the knob to the valve stem. Carried by the knob 60 there are three spaced cam follower or adjustment members 63, 64 and 65. Two of the cam follower members 63, 64, overlie and are arranged to ride on the inner or smaller cam surface 57, while the other follower member 65 overlies and is arranged to ride on the larger and outer cam surface 58. The follower members 63, 64 and 65 are preferably in the form of screws and are adjustably screw-threaded in threaded apertures 66 that extend vertically through the knob 60.

Figure 9:
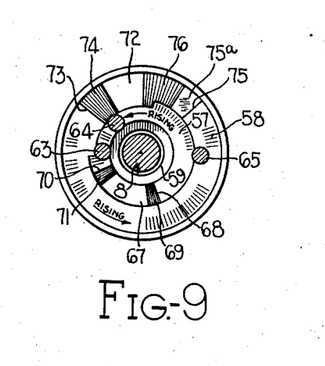
Fig. 9 is a view in section taken on the line 9—9 of Fig. 8.

The base or bottom of the offset wall portion 56 preferably has an arcuate aperture or opening 67 therethrough with opposite inclined ends, Fig. 9, that interrupts the inner or smaller diameter cam surface 57 and is of sufficient length for receiving both of the adjustment members 63, 64 at the same time. The low point of the inner cam surface 57 is designated by the numeral 68, and leading up to the low point within the aperture 67 there is preferably an abruptly inclined wall portion 69 up which the adjustment members 63, 64 ride to the low point 68 of the cam. The cam surface 57 extends around the valve stem 8 with gradually rising inclination, terminating at its high point, designated by the numeral 70, adjacent the opposite side or end of the arcuate aperture 67. From the cam high point 70 there is preferably an abruptly inclined wall portion 71 that leads down from the high point 70 and is within the space or aperture 67 such that the end walls of the opening 67 are formed by the portions 69 and 71. The base or bottom of the offset wall portion 56 is also provided with an arcuate aperture 72 therethrough, interrupting the outer or larger diameter cam surface 58, for receiving the follower or adjustment member 65. The low point of the outer cam surface 58 is designated by the numeral 73, and leading up to the low point 73 there is preferably an abruptly inclined wall portion 74. The cam surface 58 extends from its low point 73, with gradual but greater rate of rise or pitch than cam 57, to its high point designated by the numeral 75, a cam "flat" or horizontal portion 75a being positioned between point 75 and the other side of the aperture 72. The cam 58 is preferably formed having an abruptly inclined wall portion 76 leading down from its high point 75, or "flat" 75a, and within the arcuate aperture 72 such that the end walls of the opening 72 are formed by the wall portions 74 and 76. The adjustment members 63, 64 and 65 and the arcuate apertures 67 and 72 are arranged so that when the valve stem is rotated to one position the members 63, 64 will drop down into aperture 67 and the member 65 will drop down into aperture 72, permitting the valve to descend and positively engage with its seat.

The adjustment member 63 is adjusted so that it will engage and climb the abruptly inclined portion 69 when the valve stem 8 is rotated from closed position in a valve opening or counterclockwise direction, as viewed in Fig. 9. The adjustment member 64 is also adjusted so that it will engage the abruptly inclined inner cam portion 69 when the valve stem is rotated a further distance in a valve opening direction. The adjustment member 64 extends downward to a lower point than the adjustment member 63 so that when the member 64 rides up the inclined portion 69, the valve will be raised at a greater rate than it was being raised by travel of member 63 on the surface 57. The member 63 will, of course, be moved upward out of engagement with the cam surface 57 upon actuative engagement of member 64 with incline 69. The adjustment member 65 is adjusted so that it will engage the cam surface 58, at a predetermined point in the valve opening or closing movement, and after predetermined rotation of the valve stem 8 to move the valve in a valve opening or closing direction. The adjustment members 63, 64 and 65 may be termed respectively the pilot flame adjustment, the minimum flame adjustment, and the maximum flame adjustment. The lower ends of the adjustment members 63, 64 and 65 are preferably rounded to reduce friction between the adjustment members and the cam surfaces. The adjustment members 63, 64 and 65 have heads 77 provided with slots for receiving a tool, such as a screw driver, for adjusting the members 63, 64 and 65 up or down within and relative to the knob 60. The top face of the knob 60 is preferably provided with a diametral slot or recess 78 running in from one edge of flange 60a and in which a horizontal plate-like portion of a pointer member 79 positions and is clamped by the nut 62, the upper surface of said portion being substantially flush with the upper surface of the knob 60. The horizontal portion of the pointer member 79 overlies and closes all of the apertures 66 and has a downturned or directed end portion 80, the lower end of which is disposed adjacent the upper face of cover 2 for cooperation with indicia on the cover top face so that the valve can be set for a desired rate of fluid flow, or in a desired position.

In heating apparatus having a certain type of burner, such as for example the type of burner shown in Fig. 14, it is very advantageous to be able to turn the burner flame down to a low pilot size flame when desired, as is indicated in dotted lines. This type of burner has a fuel outlet member 82 surrounded by a fire pot 83 having an opening 84 in its top wall for the egress of the fuel or fuel vapor for mixture with the ambient air. In such burners when the rate of supply of fuel thereto is high, the flame or flames are correspondingly high and are for the most part entirely outside of the fire pot 83, as illustrated in full lines. When the rate of flow of fuel is decreased, possibly the entire flame will burn within the fire pot 83, depending of course upon the rate of supply of fuel thereto. If the valve can not be closely adjusted so that there is a lack of sufficient air relative to fuel to provide a good combustible mixture, carbon will be deposited at a great rate on the inner side walls of the fire pot and there will be a smoky flame, which is of course objectionable. By my adjustment means employing the third or pilot flame adjustment member 63, a low or pilot size flame, as at 85, may be readily obtained so that little or no carbon will be deposited on the inner walls of the fire pot, and so that a smokeless flame will be provided. In certain other types of burners, such as the type shown in Fig. 13, a low pilot flame is not necessary and as a result the pilot flame adjustment member 63 may be eliminated if desired. The burner of Fig. 13 has a fire pot 86 provided with an open upper end for the egress of the combustible mixture and having a plurality of apertures 87 in its side wall for the entrance of air into the fire pot. When the fuel supply to this type of burner is turned low so that the flames are inside of the fire pot, carbon will not collect on the innerside walls of the burner at as great a rate as it will on the walls of the burner of Fig. 14, even with the pilot adjustment 63, because the air entering the apertures 87 will prevent incomplete combustion. However, my flame adjustment means including the low pilot flame adjustment member 63 may be employed to good advantage with any type burner.

Figure 8:
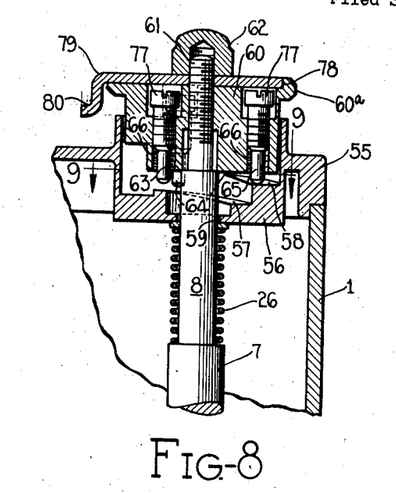
Fig. 8 is a view in vertical central section of a further modification of my adjusting means.
Figure 10:
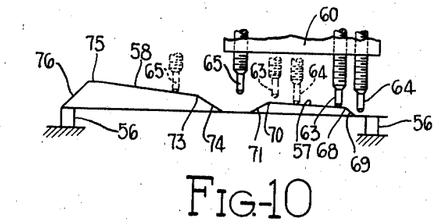
Fig. 10 is a diagrammatic view of the adjusting means of Figs. 8 and 9, and showing in dotted lines an advanced position of the means.

Referring now particularly to the diagrammatic showing of Fig. 10, the relative positions of the valve adjusting means of Figs. 8 and 9 are shown. Starting from closed position, when the valve stem 8 is rotated in a counterclockwise direction, as viewed in Fig. 9, the pilot flame adjustment member 63 is first engaged with and then moved or forced up the incline 69 onto the cam surface 57, see Fig. 10. When the adjustment member 63 is moved up onto the low point 68 of the cam 57, in which position the member 63 will be held by friction, the valve member 7 will have been moved upward an extent to permit a small rate of flow of fuel to a burner for obtaining a small or pilot flame. The rate of flow of fuel to the burner, and therefore the size of the pilot flame when member 63 is seated on the low point 68 of the cam 57, will depend on the position to which the pilot adjustment member 63 is adjusted relative to the valve seat or the incline 69 when the valve is closed. That is, the adjustment member 63 may be adjusted so that it will first engage the incline 69 at any point therealong in order to obtain a desired rate of flow of fuel to the burner when the member 63 is resting on the low point of the cam. In certain installations it may be found desirable to have a relatively high pilot flame, in which event the adjustment member 63 will be lowered in the supporting member 60 so that it will have to traverse more of the incline before reaching the low point 68 of the cam 57, i. e., will have a greater lift before resting upon the low point 68. Such a change in adjustment of member 63 will, of course, correspondingly increase the distance through which the valve is moved upward, with corresponding increase in the rate of flow of fuel to a burner. Having established the proper or desired minimum low pilot flame, the size of the pilot flame may be increased by further rotating the member 60. After predetermined rotation of member 60 in a valve opening direction, depending upon the arcuate spacing between members 63, 64, the inclination of portion 69 and the relative spacing longitudinally of the stem 8 of the surface-engaging ends of members 63, 64, the minimum flame adjustment member 64 will engage and upon continued rotation climb the incline 69. When the minimum adjustment member 64 starts to climb the incline 69, the valve is moved upward abruptly and the pilot flame adjustment member 63 is moved simultaneously out of engagement with the cam surface 57. The point on the cam surface 57 at which the pilot flame adjustment member 63 leaves this cam surface 57 depends upon the fixed and adjustable variables of inclination and spacing above noted, which may be selected in accordance with the operation desired. The maximum high pilot flame is obtained when the pilot flame adjustment member 63 is resting on the cam 57 at the point just before it is moved upward away from and leaves the cam surface due to lifting of the valve by member 64. It will thus be seen that the size of the pilot flame may be varied between the limits of minimum and maximum flames, and that said minimum and maximum limits may be selected as desired within the limits of screw member 63 to accommodate a particular heating apparatus. When the adjustment member or cam follower 64 is resting on the low point 68 of the cam 57, a minimum rate of flow of fuel will be supplied to the burner to obtain a minimum burner flame as distinguished from a "pilot" flame. In the case of burners of the type shown in Fig. 14, the minimum flame adjustment member 64 will be adjusted so that substantially all of the flame will be outside of the fire pot 83 to thus decrease the rate of deposit of carbon on the inner walls of the fire pot. When the valve is further rotated in a valve opening direction from the position in which member 64 is on point 68, the minimum adjustment member 64 will climb the cam surface 57, thereby further increasing the rate of flow of fuel to the burner. After the minimum flame adjustment member 64 has traversed a predetermined portion of the cam 57, the maximum flame adjustment member 65 will, depending on the setting of member 65, first engage the outer cam surface 58 and not the inclined portion 74. Upon further rotation of the valve stem 8, the maximum flame adjustment member 65 will climb the cam surface 58, which will move the adjustment member 64 simultaneously out of engagement with the cam surface 57 since the outer cam 58 has a greater rate of rise or inclination than surface 57. The minimum high burner flame is obtained when the minimum adjustment member or follower 64 is resting on the cam 57 at the point just prior to its leaving the cam surface under the lifting action of member 65. The adjustment member 64 thus has a flame regulating range between the limits of minimum low and minimum high flame, which limits may be changed by adjusting member 64 to accommodate different installations. By rotating the valve stem 8 until the maximum flame adjustment member 65 rests on the high point 75, or portion 75ª, of the cam 58, the maximum high burner flame will be obtained. Further rotation of the hand grip member 60 serves to set the adjustment members or cam follower members in position to descend simultaneously by force of gravity and spring 26, into the apertures 67 and 72 permitting the valve to seat. The maximum low burner flame is obtained when the maximum flame adjustment member 65 first engages the cam 58. The member 65 thus has a valve adjusting range between the limits of maximum low and high flames, which limits may be changed by adjusting member 65 to accommodate different installations.

Figure 11:
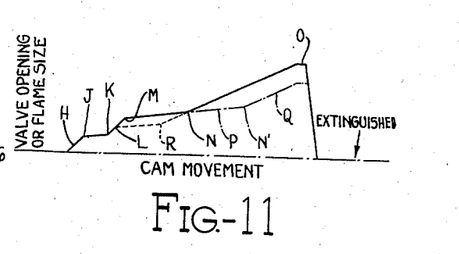
Fig. 11 is a chart for illustrating how the flame of a burner may be regulated by the valve adjusting means of Figs. 8 and 9.

In the chart of Fig. 11, the abruptly inclined line portion H represents the abrupt increase in the valve opening movement as the pilot adjustment member 63 rides up the incline or gradient 69 of cam 57. The point J represents the minimum low pilot flame desired to be maintained and the point K represents the maximum high pilot flame. The abruptly inclined line L represents the abrupt increase in valve opening movement and in the size of the flame as the minimum adjustment member 64 rides up the cam incline or gradient 59 to the low point 58. The point M represents the minimum low flame desired to be maintained and the point N the minimum high flame obtainable by the member 64. The point N also represents the maximum low flame obtainable by the member 65 and the point O represents the maximum high burner flame obtainable by the member 65. The minimum high and the maximum low flames may be changed by adjusting the minimum adjustment member 64 or the maximum adjustment member 65. Such a change in the minimum high flame and maximum low flame by member 64 or 65 is illustrated respectively by the dotted line R and by the dot-and-dash line P, but it is to be understood that this is only one of a multitude of adjustments that can be made. The dot-and-dash line P is representative of a condition where the maximum adjustment member 65 has been raised so that it will first engage its cam 58 at a higher point thereof. The flame now has a longer gradual change from minimum low flame to the new minimum high flame at N before the maximum flame adjustment member 65 first engages its cam 58. Continued rotation of the valve will cause the member 65 to ride up the gradient cam surface 58 as is indicated by line Q, but the lower end of member 65 having been raised relative to the valve stem, the maximum open position of the valve will be less, that is, there will be a lessened rate of flow when the member 65 is on the cam portion 75ª, than before this adjustment of member 65. It will also be apparent that the upper limit of valve opening movement designated by line N—O can be maintained while providing a decreased extent of opening under the action of member 64, which change would be accomplished by raising the lower end of member 64 relative to supporting member 60.

Figure 12:
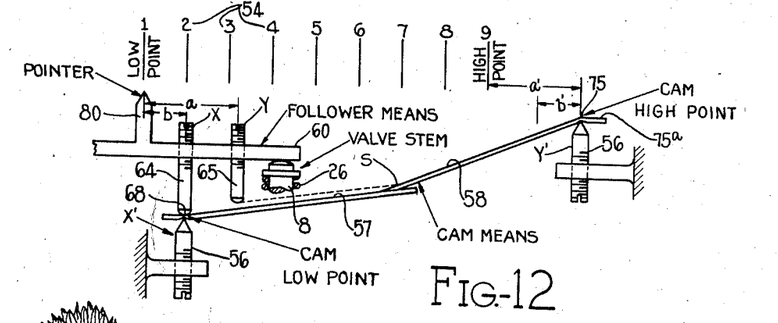
Fig. 12 is a diagrammatic view showing the cooperative relation of parts of my control device adjusting means and also showing the obvious reversal of the cooperating adjustable and fixed parts.

Referring to Fig. 12, the reference numerals are those applied to the constructions shown in Figs. 8 and 9, with the numerals 56 designating the support for the cam means or track. The supporting means 56, 56 of Fig. 12 is also designated $x'$, $y'$ which are adjustable elements which would be the full equivalent of means for tilting or rocking the cover 55 or base 56 of Fig. 8 relative to the side walls of casing 1 and valve stem 8. In this Fig. 12, it will be apparent that the pointer 80 will be aligned with the numeral "1" of the indicia 54 and thereby designate the low point of valve adjustment irrespective of adjustment or raising and lowering of follower member 64 which is also designated $x$. With the element 64, 65 adjusted as diagrammatically shown, the follower element 65 will engage the cam track portion 58 substantially at the point s, since it will travel relatively parallel to the surface of track portion 57 as element 64 rides on the surface 57, and as soon as element 65 engages the surface of track portion 58 and starts to ride up this portion, the follower element 64 will be lifted off the track portion 57 so that the valve member or stem 8 will have a greater rate of position change for each increment of relative movement between element 65 and track portion 58 than the stem had during cooperative movement of element 64 on portion 57. The tracks or surfaces 57, 58 are of course displaced as in Figs. 8 and 9 so that the follower 64 will not engage the surface 58 during the travel of follower 65 upon the inclined surface 58. Adjustment of the follower element 65 either up or down relative to its support 60 will not change the relation of the pointer 80 to the numeral "9" of the indicia 54 designating the high point, since the distances $a$ and $a'$ are equal, that is, the element 65 when it arrives at the cam high point 75 will have this position simultaneous with alignment of pointer 80 with indicia numeral "9." From the foregoing it will be seen that the desired minimum position and the desired maximum position of the valve may be adjusted relative to each other without altering the designation by the pointer 80 of the fact that the valve is at its minimum adjustment point or at its maximum adjustment point.

The adjustment of the valve as above described, has in each instance utilized the adjustment of the follower members or elements relative to a fixed cam track or surface, but it will be apparent that it is within the scope of my invention to reverse the relative adjustment and to adjust the cam track or surface relative to the follower means. Such a reversal will be apparent from an examination of Fig. 12, wherein the cam track supporting means 56 is shown as comprising adjustment members or screws $x'$, $y'$ at either end of the cam track 57, 58. Thus with the follower members 64, 65 fixed relative to their supporting member 60, elevation or depression of the screw $x'$ will raise or lower, respectively, the minimum valve position without substantially changing the relation of the pointer 80 to the indicia numeral "1." Likewise, adjustment of the supporting member $y'$ can either raise or lower the cam high point, and consequently the maximum open position of the valve, without substantially altering the relation between the pointer 80 and the indicator numeral "9" when the follower member 65 is on the high point 75. It is realized that in the diagrammatic showing, the cam low and high points 68, 75 respectively, will, upon adjustment of the cam track, travel on the arc of a circle and therefore have a slight lateral shifting, but the requisite adjustment necessary to be made by adjustment of the cam track is relatively small and therefore the lateral shifting of the cam low and high points may be disregarded for all practical purposes. With adjustment of the cam track, as a reversal of adjustment of the follower means as above specified, it will be apparent that either one or two follower members may be employed. When two follower members comprise the follower means, they will cooperate respectively with the cam low point and the cam high point. However, since with adjustment of the cam track the follower means is fixed relative to its support 60, it is immaterial whether the members $x$ and $y$ are a unit, or unitary, and practically would be such. It therefore follows that the elements $x$ and $y$, when the track is adjustable, would be a single element such as the element $x$ alone, that is, the track or cam surface 57 would be in line with or feed onto the surface 58 and the element $y$ could be dispensed with or omitted. Employing the single follower means $x$, the high and low points of valve adjustment may be adjusted relative to each other and to the valve seat, but in order to maintain proper cooperative relation between the pointer 80 at the high point indicator numeral "9," the spacing of the indicia and the position of the indicator numeral "9" would require changing. This change in the spacing and position of the indicia is accomplished by positioning the indicator numeral "9" a lateral distance $b'$ from the cam high point 75, which distance $b'$ is equal to the lateral fixed distance $b$ between the follower member $x$ and the pointer 80. The distance between point 1 and the new position of point 9, i. e., at spaced position $b'$, would of course be recalibrated or subdivided into equal parts to show equal increments of pointer 80 movement, as is now the case in the showing of Figure 10.

The indicating means described above in detail with respect to the construction of Figs. 4, 5 and 6 is likewise the indicating means preferably employed with each of the other forms of valve operating mechanism which I have shown and described, as it indicates the low and high positions of the valve and that the valve has had opening movement irrespective of changes in the adjustment of the cam follower means.

Although the adjustment means has been described as applicable to fluid controlling valve means, it should be noted that the adjustment means may also be employed for changing the position generally of any reciprocal member which is to have a predetermined extent of reciprocation with predetermined limits and an accurate graduated movement.

This application is a continuation in part of my copending application, Serial No. 109,729, filed November 7, 1936, for Valve adjusting means.

What I claim and desire to secure by Letters Patent of the United States is:

1. In a control device having a movable valve for controlling flow of a fluid, mechanism to move the valve to vary the rate of flow of the fluid comprising cam surface means, and means including a plurality of spaced cam follower members cooperable with said cam surface means, one of said means being movable relative to the other of said means and operatively connected to said valve, said follower members being arranged to successively cooperate with a single inclined portion of said cam surface means, said cam surface means having another inclined portion cooperable with one of said follower members to establish engagement between said one follower member and said single inclined portion.

2. In a valve, a movable flow controlling element, a pair of cooperable valve actuating means for moving said element, one of said means comprising a cam surface having one surface portion of predetermined inclination and having another surface portion of different inclination leading to said one portion, the other of said means comprising a pair of spaced follower members, one of said members having its cam surface engaging portions positioned for engagement with said other surface portion simultaneously with the engagement of the other of said follower members with said one surface portion so that said element will have a continuous uninterrupted movement from one rate of change of movement to another rate of change of movement.

3. In a control device having a valve for controlling flow of a fluid, mechanism for moving the valve to different positions to obtain different rates of flow of the fluid comprising cam surface means having a portion of predetermined inclination, and means including a plurality of spaced cam follower members sequentially cooperable with said portion, one of said means being operatively connected to the valve and movable relative to the other of said means, said cam follower members being arranged with their cam bearing surfaces in relative spaced relation longitudinally of the valve, said surface means having an inclined portion to establish operative engagement between one of said follower members and said first-named portion.

4. In a valve, a casing having a passageway therethrough with a valve port, a reciprocal valve member having a rotatable stem and controlling said port, a pair of relatively rotatable valve member adjusting means, one of said means comprising a substantially helical type cam surface and a relatively abruptly inclined surface leading to said cam surface, said cam surface having an inclination determining the rate of valve opening movement for each increment of rotation of said stem, the other of said means comprising a plurality of cam follower members successively engageable with said cam surface upon rotation of said stem, a subsequently engaging one of said follower members initially engaging said abrupt surface so that said valve member has during its range of opening movement a period of increase in rate of movement for each increment of rotation of said stem, and one of said means being rotatable with said stem.

5. In a valve, a casing having a passageway therethrough with a valve port, a reciprocal valve member having a rotatable stem and controlling said port, a pair of relatively rotatable valve member adjusting means, one of said means comprising a substantially helical type cam surface and a relatively abruptly inclined surface leading to said cam surface, said cam surface having an inclination determining the rate of valve member opening movement for each increment of rotation of said stem, the other of said means comprising a plurality of cam follower members successively engageable with said cam surface upon rotation of said stem, a subsequently engaging one of said follower members initially engaging said abrupt surface so that said valve member has during its range of opening movement a period of increase in rate of movement for each increment of rotation of said stem, another of said follower members being adjustable relative to said subsequently engaging member so that the extent of valve member opening movement by said other member prior to engagement of said subsequently engaging member with said abrupt surface may be predetermined, and one of said means being rotatable with said stem.

6. In a control device, a movable valve member for controlling flow of fluid, mechanism to move said valve member to vary the rate of flow of the fluid comprising means forming a cam surface, and means including a plurality of spaced cam follower members cooperable with a portion of said cam surface, one of said means being movable relative to the other of said means and operatively connected to said valve member, said follower members being arranged and constructed relative to said surface portion so that movement of said valve member by the cooperation of one of said follower members and said surface portion varies the rate of flow of fluid between predetermined limits and so that movement of said valve member by the cooperation of another of said follower members and said surface portion varies the rate of flow of fluid between predetermined limits different from said first-named predetermined limits, the movement due to said first cooperation being terminated upon the cooperative engagement of said another of said follower members with said surface portion.

7. A metering valve for controlling flow of fluid fuel to a burner, comprising a casing having an outlet, a valve controlling said outlet, cam means having a low-fire regulating cam surface with a low portion and having a high-fire regulating cam surface with a high portion, said high-fire cam surface being more steeply pitched than said low-fire cam surface, follower means comprising a pair of follower members, one of said means being carried by said valve, one of said members cooperating with said low-fire cam surface to move said valve toward open position and cooperating with said low portion to establish a desired flow to the burner, the other of said follower members cooperating with said high-fire cam surface to move said valve further toward open position and cooperating with said high portion to establish a desired greater flow to the burner, said follower members having in one position of said valve simultaneous engagement with their respective cam surfaces so that said other follower member and said high-fire cam surface will continue the opening movement of said valve.

8. In a metering valve for controlling flow of fluid fuel to a burner, a reciprocal flow controlling element having a rotatable stem, a cam member having a plurality of surface portions of different inclinations, one of said surface portions leading to and merging with another of said portions, a pair of cam follower members cooperable with said cam member, means rigidly connecting said follower members to said stem, one of said members riding on said other portion to regulate the fuel supply at a predetermined rate of change for a variable low burner flame, the other of said members being successively engageable with said one portion and then with said other portion to regulate the fuel supply first at an increased rate of change to initiate a variable high burner flame and then to regulate the fuel supply during the variable high burner flame at said predetermined rate of change.

9. In a control device, a casing having a port, a rotatable and rectilinearly movable valve controlling said port and having a stem projecting externally of said casing, means providing a cam surface, manually operable means operatively connected to said valve stem externally of said casing, an adjustable cam follower member carried by said manually operable means and cooperable with said cam surface to rectilinearly move said valve upon rotation thereof by said manually operable means, said manually operable means having an aperture opening externally thereof for access to said adjustable cam follower member, indicia for designating the setting of said valve, and a pointer member carried by said manually operable means for cooperation with said indicia, said pointer member overlying and closing said aperture.

10. In a control device, a casing having a valve port and having a recess in a wall thereof, a valve member in said casing and operable to control said port, said valve member having a stem portion projecting externally of said casing through said recess, a cam surface formed on said wall within said recess, a rotatable member positioned in said recess and secured to said stem portion, said rotatable member having an opening therethrough, an adjustable cam follower member carried by said rotatable member in said opening and accessible for adjustment from externally of said casing, said follower member being cooperable with said cam surface to move said valve member rectilinearly on rotation of said rotatable member, and means providing a pointer to indicate the position of said valve member and overlying and closing said opening.

11. In a metering valve, a casing having a passageway therethrough with a valve port, a cover member on said casing and having an aperture therethrough, a valve member cooperable with said port and having a stem extending through said aperture, a hollow cylindrical extension on said cover member in laterally spaced surrounding relation to said stem, a helical element having an upward facing cam surface within said extension concentric with said stem, said element having its ends terminating in spaced relation to provide an opening, said element having an abruptly inclined portion leading to said surface and positioned in said opening, and a pair of spaced cam follower members containable in said opening to permit closure of said valve member and successively engageable with said cam surface, the trailing one of said follower members extending further toward said valve member than the other of said follower members and being operable to engage said abrupt portion.

12. In a control device, a casing having a port, a rotatable and rectilinearly movable valve controlling said port and having a stem, means providing a cam surface, manually operable means operatively connected to said valve stem, an adjustable cam follower member carried by said manually operable means and cooperable with said cam surface to rectilinearly move said valve upon rotation thereof by said manually operable means, said manually operable means having an aperture opening externally thereof for access to said adjustable cam follower member, indicia for designating the setting of said valve, and a pointer member carried by said manually operable means for cooperation with said indicia, said pointer member overlying and closing said aperture.

13. In a control device, a casing having a valve port and having a recess in a wall thereof, a valve member in said casing and operable to control said port, said valve member having a stem portion projecting externally of said casing through said recess, a cam surface formed on said wall within said recess, a rotatable member positioned in said recess and secured to said stem portion, said rotatable member having an opening therethrough, and an adjustable cam follower member carried by said rotatable member in said opening and accessible for adjustment from externally of said casing, said follower member being cooperable with said cam surface to move said valve member rectilinearly on rotation of said rotatable member.

14. A metering valve for controlling flow of fluid fuel to a burner, comprising a casing having an outlet, a valve controlling said outlet, cam means having a low-fire regulating cam surface with a low portion and having a high-fire regulating cam surface with a high portion, follower means comprising a pair of follower members, one of said means being carried by said valve, one of said members cooperating with said low-fire cam surface to move said valve toward open position, means to adjust said one member relative to said low portion to establish a desired flow to the burner, the other of said follower members cooperating with said high-fire cam surface to move said valve further toward open position, means to adjust said other member relative to said high portion to establish a desired greater flow to the burner, said high-fire cam surface having a steeper pitch than said low-fire cam surface, said follower members having in one position of said valve simultaneous engagement with their respective cam surfaces, and said follower means and said cam means being so constructed and arranged relative to each other that said valve will have opening movement from the engagement of said one follower member with said low portion to the engagement of said other follower member with said high portion.

15. A metering valve for controlling flow of fluid fuel to a burner, comprising a casing having an outlet, a supporting member carried by said casing and having an aperture therethrough concentric with said outlet, a valve controlling said outlet and having a stem extending through said aperture, cam means on said supporting member, said cam means having a helical-type low-fire regulating cam surface with a low portion and having a helical-type high-fire regulating cam surface with a high portion, lateral supporting means carried by said stem, adjustable cam follower members projecting from said supporting means and longitudinally of said stem, one of said follower members being engageable with said low-fire cam surface to move said valve toward open position and the other of said follower members being engageable with said high-fire cam surface to move said valve further toward open position, said one follower member being adjustable relative to said low portion to establish a desired flow to the burner, the other of said follower members being adjustable relative to said high portion to establish a desired greater flow to the burner, said other follower member engaging said high-fire cam surface prior to disengagement of said one follower member with said low-fire cam surface so that said valve will have opening movement from the engagement of said one follower member with said low portion to the engagement of said other follower member with said high portion.

16. A metering valve for controlling flow of fluid fuel to a burner, comprising a casing having an outlet, a supporting member carried by said casing and having an aperture therethrough concentric with said outlet, a valve controlling said outlet and having a stem extending through said aperture, cam means on said supporting member, said cam means having a helical-type low-fire regulating cam surface with a low portion and having a helical-type high-fire regulating cam surface with a high portion, lateral supporting means carried by said stem, adjustable cam follower members projecting from said supporting means and longitudinally of said stem, one of said follower members being engageable with said low-fire cam surface to move said valve toward open position and the other of said follower members being engageable with said high-fire cam surface to move said valve toward open position, said one follower member being adjustable relative to said low portion to establish a desired flow to the burner, the other of said follower members being adjustable relative to said high portion to establish a desired greater flow to the burner, said supporting member having a steeply inclined portion leading to said low portion for lifting said one follower member onto said low portion, an abutment member on said stem, and a helical coil spring surrounding said stem and tending to hold said follower members in cooperative relation with their cam surfaces and acting to oppose the resting of said one follower member upon said steeply inclined portion.

17. A metering valve for controlling flow of fluid fuel to a burner, comprising a casing having an outlet, a supporting member carried by said casing and having an aperture therethrough concentric with said outlet, a valve controlling said outlet and having a stem extending through said aperture, cam means on said supporting member, said cam means having a helical-type low-fire regulating cam surface with a low portion and having a helical-type high-fire regulating cam surface with a high portion, lateral supporting means carried by said stem, adjustable cam follower members projecting from said supporting means and longitudinally of said stem, one of said follower members being engageable with said low-fire cam surface to move said valve toward open position and the other of said follower members being engageable with said high-fire cam surface to move said valve further toward open position, said one follower member being adjustable relative to said low portion to establish a desired flow to the burner, the other of said follower members being adjustable relative to said high portion to establish a desired greater flow to the burner, said high-fire cam surface being more steeply inclined than said low-fire cam surface, said other follower member engaging said high-fire cam surface prior to disengagement of said one follower member with said low-fire cam surface so that said valve will have opening movement from the engagement of said one follower member with said low portion to the engagement of said other follower member with said high portion, said supporting member having a steeply inclined portion leading to said low portion for lifting said one follower member onto said low portion, an abutment member on said stem, and a helical coil spring under compression and positioned between said supporting member and said abutment member, said spring tending to hold said follower members in cooperative relation with their cam surfaces and acting to oppose the resting of said one follower member upon said steeply inclined portion.

18. In a valve, a casing having a passageway therethrough including a valve port, a cover member on said casing and having an aperture therethrough, a movable flow controlling element within said casing and cooperable with said port to control flow of liquid therethrough and having a portion extending through said aperture external of said casing, a pair of cooperable valve actuating means within said casing and for moving said element, one of said means comprising a cam surface having one surface portion of predetermined inclination and having another surface portion of different inclination leading to said one portion, the other of said means comprising a pair of spaced follower members, one of said members having its cam surface engaging portion positioned for engagement with said other surface portion simultaneously with the engagement of the other of said follower members with said one surface portion so that said element will have a continuous uninterrupted movement from one rate of change of movement to another rate of change of movement, one of said means being rigidly secured to said casing and the other of said means being rigidly secured to said element.

19. In a metering valve, a casing having a passageway therethrough with a valve port, a cover member on said casing and having an aperture therethrough, a valve member cooperable with said port and having a stem extending through said aperture, a hollow cylindrical extension on said cover member in laterally spaced surrounding relation to said stem, a helical element having an upward facing cam surface within said extension concentric with said stem, said element having its ends terminating in spaced relation to provide an opening, said element having an abruptly inclined portion leading to said surface and positioned in said opening, a pair of spaced cam follower members containable in said opening to permit closure of said valve member and successively engageable with said cam surface, the trailing one of said follower members extending further toward said valve member than the other of said follower members and being operable to engage said abrupt portion, a second helical element concentric with said first element and having an upward facing cam surface within said extension, and a cam follower member operable to permit closure of said valve when said pair of members are contained in said opening, said last-named member being engageable with said last-named surface upon predetermined movement of said other follower member on said first-named cam surface.

ALBERT G. HANN.